US009043436B2

(12) United States Patent
Dudek et al.

(10) Patent No.: US 9,043,436 B2
(45) Date of Patent: *May 26, 2015

(54) DISTRIBUTING LICENSED CONTENT ACROSS MULTIPLE DEVICES

(75) Inventors: Clark A. Dudek, Raleigh, NC (US); William G. Pagan, Durham, NC (US); William K. Reeves, Cary, NC (US); Adrian X. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 13/492,146

(22) Filed: Jun. 8, 2012

(65) Prior Publication Data
US 2013/0104248 A1   Apr. 25, 2013

Related U.S. Application Data

(63) Continuation of application No. 13/279,604, filed on Oct. 24, 2011.

(51) Int. Cl.
G06F 21/10    (2013.01)
H04L 29/06    (2006.01)
H04W 4/02     (2009.01)
G06F 17/30    (2006.01)
H04W 4/04     (2009.01)

(52) U.S. Cl.
CPC .............. *G06F 21/10* (2013.01); *H04L 63/107* (2013.01); *H04W 4/02* (2013.01); *G06F 17/30743* (2013.01); *H04W 4/043* (2013.01)

(58) Field of Classification Search
CPC ...... H04L 63/107; H04L 67/125; H03G 3/32; G06F 17/30743; G06F 21/10; H04W 4/02; H04W 4/025; H04W 4/043
USPC ................. 709/203, 217, 219, 223, 225, 226; 726/26, 29, 27, 28; 705/59; 73/646
See application file for complete search history.

(56) References Cited

U.S. PATENT DOCUMENTS 5,655,144  A   8/1997   Milne et al.
7,344,084  B2  3/2008   DaCosta
7,424,747  B2  9/2008   DeTreville
7,607,582  B2  10/2009  Vallabh et al.

(Continued)

OTHER PUBLICATIONS

Combined Search and Examination Report; Mar. 5, 2013; IPO Application No. GB1216682.3; pp. 1-6.

(Continued)

Primary Examiner — Ramy M Osman
(74) Attorney, Agent, or Firm — Edward J. Lenart; Mark McBurney; Kennedy Lenart Spraggins LLP

(57) ABSTRACT

Distributing licensed content across multiple devices, including: identifying, by a mobile device, licensed content being presented by a local presentation device; determining, by the mobile device, whether the mobile device is eligible to receive the licensed content; requesting, by the mobile device, a license for the licensed content being presented by the local presentation device; receiving, by the mobile device, the license for the licensed content being presented by the local presentation device; receiving, by the mobile device, licensed content for mobile device presentation; and presenting, by the mobile device, the licensed content for mobile device presentation.

8 Claims, 4 Drawing Sheets

(56) References Cited

U.S. PATENT DOCUMENTS

| | | |
|---|---|---|
| 7,616,840 B2 | 11/2009 | Erol et al. |
| 7,783,489 B2 | 8/2010 | Kenyon et al. |
| 7,870,574 B2 | 1/2011 | Kenyon et al. |
| 7,873,974 B2 | 1/2011 | DaCosta |
| 8,191,154 B2 * | 5/2012 | Singer et al. ............ 726/26 |
| 8,555,721 B2 * | 10/2013 | Taillet ............ 73/579 |
| 2002/0152095 A1 | 10/2002 | Jordon |
| 2005/0065891 A1 * | 3/2005 | Lee et al. ............ 705/59 |
| 2007/0100766 A1 | 5/2007 | Healy et al. |
| 2008/0320605 A1 | 12/2008 | Ben-Yaacov et al. |
| 2009/0183264 A1 * | 7/2009 | Chmaytelli et al. ............ 726/28 |
| 2009/0188322 A1 * | 7/2009 | Taillet ............ 73/646 |
| 2010/0125511 A1 | 5/2010 | Jouret et al. |
| 2011/0154448 A1 * | 6/2011 | Oida et al. ............ 726/4 |
| 2011/0231941 A1 * | 9/2011 | Singer et al. ............ 726/29 |
| 2011/0258329 A1 * | 10/2011 | Lee et al. ............ 709/227 |
| 2012/0079601 A1 * | 3/2012 | Gava et al. ............ 726/26 |
| 2012/0124613 A1 | 5/2012 | Reddy et al. |
| 2012/0263020 A1 * | 10/2012 | Taylor et al. ............ 367/124 |
| 2013/0311080 A1 * | 11/2013 | Wirola et al. ............ 701/409 |

OTHER PUBLICATIONS

Paterno et al., "Ambient Intelligence for Supporting Task Continuity Across Multiple Devices and Implementation Languages", The Computer Journal, Mar. 13, 2009, pp. 1210-1228, vol. 53, No. 8, Oxford University Press, Pisa, Italy.

Suomalainen et al., "Content Protection and Authorized Sharing for Mobile Broadcast", Research Seminar on Digital Media, Sep. 5, 2005, pp. 1-16, Helsinki University of Technology, Finland.

* cited by examiner

DISTRIBUTING LICENSED CONTENT ACROSS MULTIPLE DEVICES

CROSS-REFERENCE TO RELATED APPLICATION

This application is a continuation application of and claims priority from U.S. patent application Ser. No. 13/279,604, filed on Oct. 24, 2011.

BACKGROUND OF THE INVENTION

1. Field of the Invention

The field of the invention is data processing, or, more specifically, methods, apparatus, and products for distributing licensed content across multiple devices.

2. Description of Related Art

Modern computing devices are becoming smaller and more mobile in nature. Mobile computing devices such as mobile phones, tablet computers, laptop computers, and the like are becoming increasingly more powerful. Such mobile computing devices may be technologically suitable for delivering content such as sporting events, movies, and other multimedia content. Typically, however, such multimedia content is subject to licensing restrictions that may limit the availability of such multimedia content.

SUMMARY OF THE INVENTION

Methods, apparatus, and products for distributing licensed content across multiple devices, including: identifying, by a mobile device, licensed content being presented by a local presentation device; determining, by the mobile device, whether the mobile device is eligible to receive the licensed content; requesting, by the mobile device, a license for the licensed content being presented by the local presentation device; receiving, by the mobile device, the license for the licensed content being presented by the local presentation device; receiving, by the mobile device, licensed content for mobile device presentation; and presenting, by the mobile device, the licensed content for mobile device presentation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
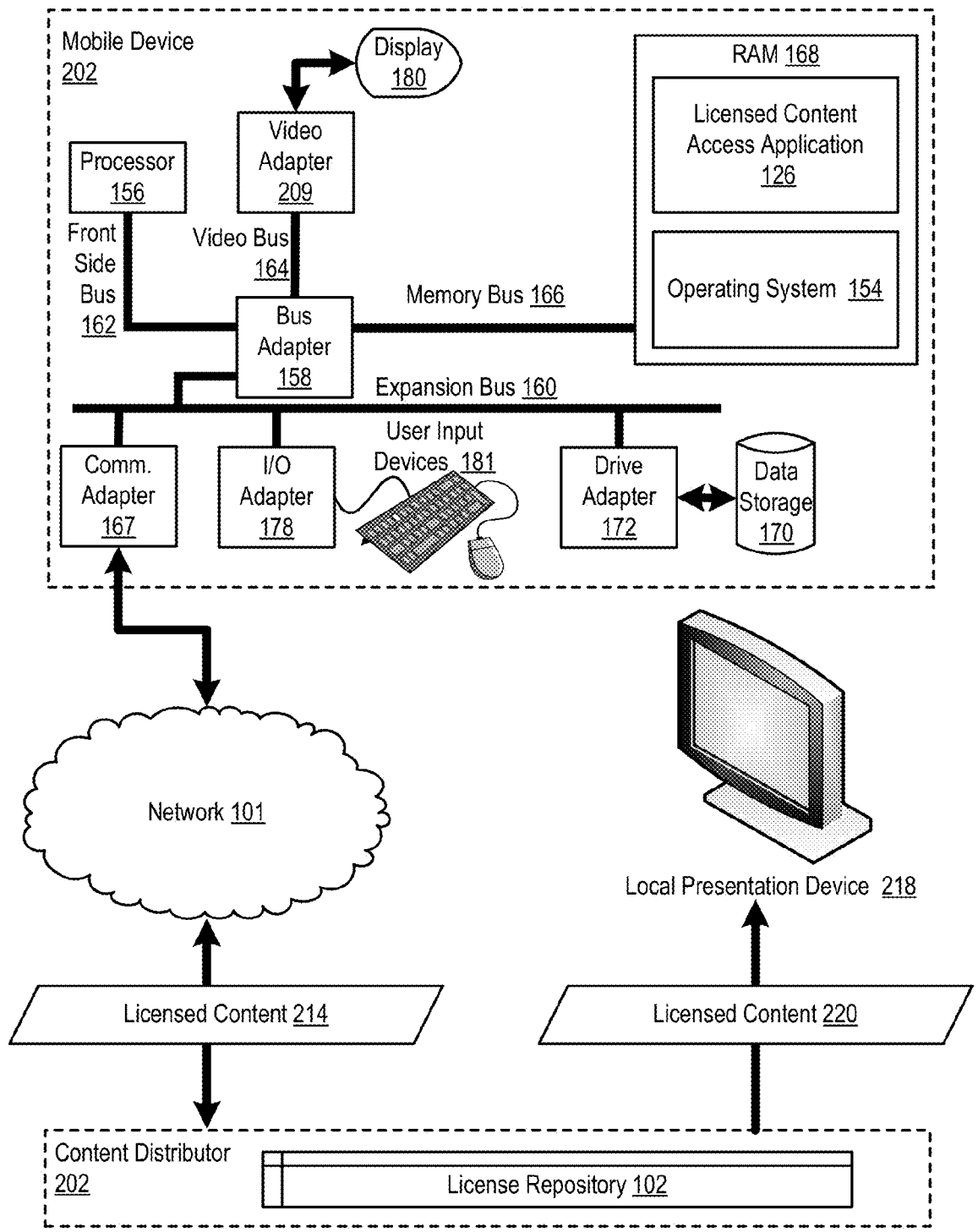
FIG. 1 sets forth a block diagram of automated computing machinery comprising an exemplary mobile device useful in distributing licensed content across multiple devices according to embodiments of the present invention.

Exemplary methods, apparatus, and products for distributing licensed content across multiple devices in accordance with the present invention are described with reference to the accompanying drawings, beginning with FIG. 1. FIG. 1 sets forth a block diagram of automated computing machinery comprising an exemplary mobile device (202) useful in distributing licensed content across multiple devices according to embodiments of the present invention. The mobile device (202) of FIG. 1 includes at least one computer processor (156) or 'CPU' as well as random access memory (168) ('RAM') which is connected through a high speed memory bus (166) and bus adapter (158) to processor (156) and to other components of the mobile device (202).

Stored in RAM (168) is a licensed content access application (126), a module of computer program instructions for assisting in the distribution of licensed content across multiple devices according to embodiments of the present invention. The licensed content access application (126) includes computer program instructions that, when executed by the computer processor (156), cause the mobile device (202) to carry out the step of identifying licensed content (220) being presented by a local presentation device (218) such as a television, video projector, or other device for presenting audio/video content. Such licensed content (220) that is being presented by the local presentation device (218) may include, for example, pay-per-view content such as a boxing match, concert, and so on. Licensed content (220) that is being presented by the local presentation device (218) may also include on-demand content such as movies, over-the-air programming broadcast over a television network, and any other content that cannot be redistributed legally without the acquisition of a license from the producer or distributor of the licensed content.

The licensed content access application (126) can also include computer program instructions that, when executed by the computer processor (156), cause the mobile device (202) to carry out the step of requesting a license for the licensed content (220) being presented by the local presentation device (218). Requesting a license for the licensed content (220) being presented by the local presentation device (218) may be carried out, for example, by submitting a request for a license to the distributor (202) of the licensed content. The distributor (202) of the licensed content may be embodied, for example, as a television service provider, a television network, and so on. The distributor (202) of the licensed content may have one or more licenses stored in a license repository (102) for distribution to licensees. The request for a license for the licensed content may include, for example, an identification of the licensed content, the location of the mobile device (202), and so on.

The licensed content access application (126) can also include computer program instructions that, when executed by the computer processor (156), cause the mobile device (202) to carry out the step of receiving the license for the licensed content (220) being presented by the local presentation device (218). The license for the licensed content (220) being presented by the local presentation device (218) may be received, for example, via a message that is sent to the mobile device (202) from the distributor of the licensed content. The license may include certain restrictions, for example, restrictions identifying the length of time that the license valid, restrictions indicating that the license is invalid if the mobile device (202) leaves a predetermined area, restrictions indicating that the license is not transferable, and so on.

The licensed content access application (126) can also include computer program instructions that, when executed by the computer processor (156), cause the mobile device (202) to carry out the step of receiving licensed content (214) for mobile device (202) presentation. The licensed content (214) for mobile device (202) presentation represents a version of the licensed content (220) that is being delivered by the local presentation device (218). The licensed content (214) for mobile device (202) presentation may be different than the licensed content (220) that is being delivered by the local presentation device (218). For example, the licensed content (214) for mobile device (202) presentation may be in a data format that is compatible with the mobile device (202) but incompatible with the local presentation device (218). The licensed content (214) for mobile device (202) presentation may be received, for example, through a streaming video feed, through a special purpose application installed on the mobile device (202), and in other ways as will occur to those of skill in the art.

The licensed content access application (126) can also include computer program instructions that, when executed by the computer processor (156), cause the mobile device (202) to carry out the step of presenting the licensed content (214) for mobile device (202) presentation. Presenting the licensed content (214) for mobile device (202) presentation may be carried out, for example, by delivering video content associated with the licensed content over a display (180) of the mobile device (202), by delivering audio content associated with the licensed content over a speakers installed in the mobile device (202), and so on.

Also stored in RAM (168) is an operating system (154). Operating systems useful distributing licensed content across multiple devices according to embodiments of the present invention include UNIX™, Linux™, Microsoft XP™, AIX™, IBM's i5/OS™, Android™ OS, Apple iOS™, and others as will occur to those of skill in the art. The operating system (154) and the licensed content access application (126) in the example of FIG. 1 are shown in RAM (168), but many components of such software typically are stored in non-volatile memory also, such as, for example, on a disk drive (170).

The mobile device (202) of FIG. 1 includes disk drive adapter (172) coupled through expansion bus (160) and bus adapter (158) to processor (156) and other components of the mobile device (202). Disk drive adapter (172) connects non-volatile data storage to the mobile device (202) in the form of disk drive (170). Disk drive adapters useful in computers for distributing licensed content across multiple devices according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example mobile device (202) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards, mice, touch screen displays, keypads, and so on. The example mobile device (202) of FIG. 1 includes a video adapter (209), which is an example of an I/O adapter specially designed for graphic output to a display device (180) such as a touch screen display, computer monitor, and so on. Video adapter (209) is connected to processor (156) through a high speed video bus (164), bus adapter (158), and the front side bus (162), which is also a high speed bus.

The exemplary mobile device (202) of FIG. 1 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, telecommunications networks, and in other ways as will occur to those of skill in the art. Communications adapters implement the hardware level of data communications through which one computer sends data communications to another computer, directly or through a data communications network. Examples of communications adapters useful for distributing licensed content across multiple devices according to embodiments of the present invention include modems for wired dial-up communications, Ethernet (IEEE 802.3) adapters for wired data communications network communications, and 802.11 adapters for wireless data communications network communications.

Figure 2:
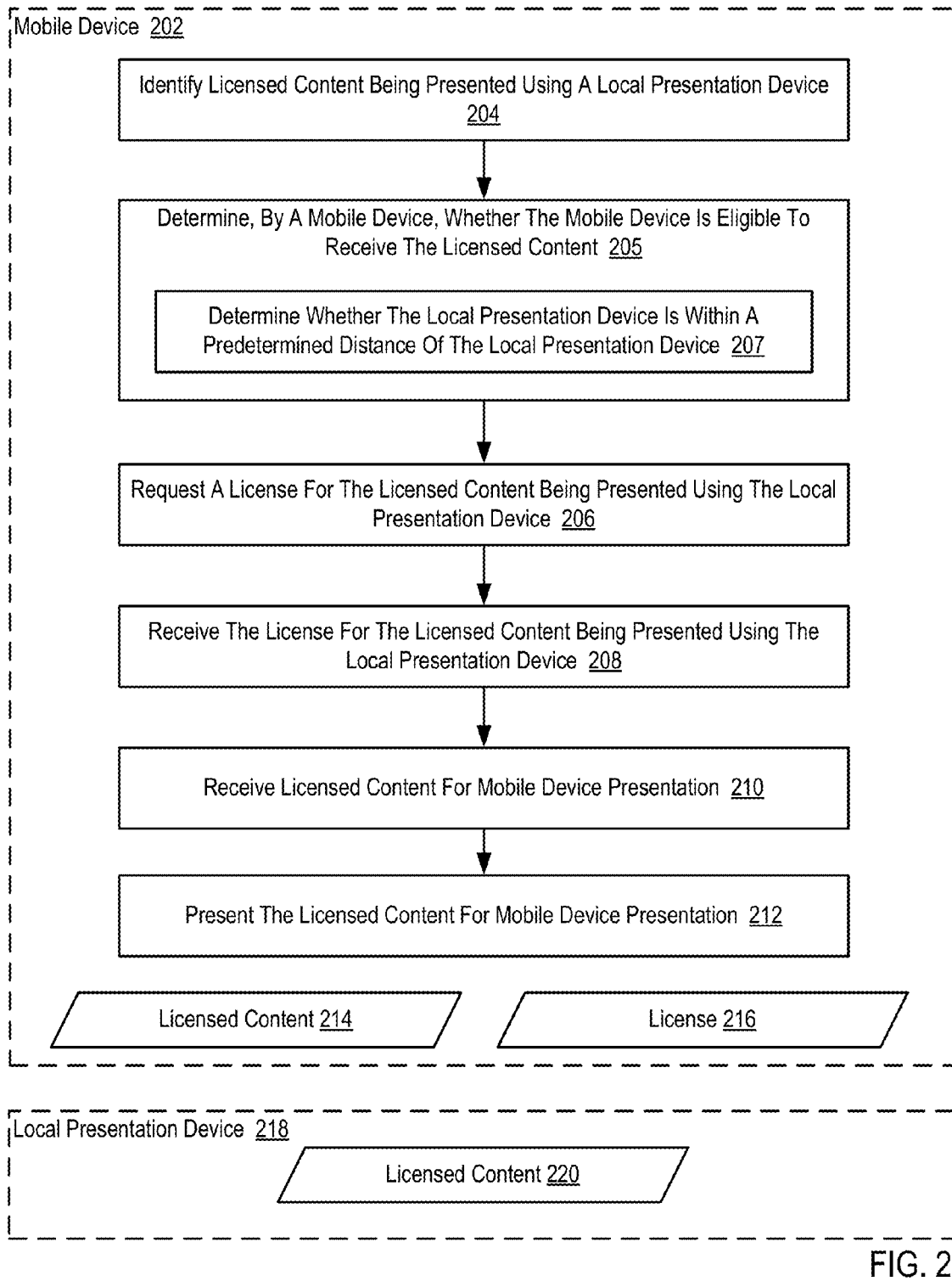
FIG. 2 sets forth a flow chart illustrating an exemplary method for distributing licensed content across multiple devices according to embodiments of the present invention.

For further explanation, FIG. 2 sets forth a flow chart illustrating an exemplary method for distributing licensed content across multiple devices according to embodiments of the present invention. The example method if FIG. 2 includes identifying (204), by a mobile device (202), licensed content (220) being presented by a local presentation device (218). In the example of FIG. 2, the mobile device (202) may be embodied, for example, as a mobile telecommunications device, a laptop computer, a tablet computer, or other mobile device capable of presenting audio/video content. The local presentation device (218) of FIG. 2 may be embodied, for example, as a television, video projector, or other device for presenting audio/video content. In the example method of FIG. 2, licensed content (220) that is being presented by a local presentation device (218) may include, for example, pay-per-view content such as a boxing match, concert, and so on. Licensed content (220) that is being presented by a local presentation device (218) may also include on-demand content such as movies, over-the-air programming broadcast over a television network, and any other content that cannot be redistributed legally without the acquisition of a license from the producer or distributor of the licensed content (220).

The mobile device (202) of FIG. 2 identifies (204) licensed content (220) that is being presented by a local presentation device (218). In the example method of FIG. 2, identifies (204) licensed content (220) that is being presented by a local presentation device (218) may be carried out, for example, by comparing attributes of the licensed content (220) to a content repository. For example, the audio content of the licensed content (220) may be recorded and matched against a repository of known audio content such that, for example, if the licensed content includes the line "I'm going to make him an offer he can't refuse," it can be determined that the licensed content (220) that is being presented by the local presentation device (218) is the movie "The Godfather." Readers will appreciate that identifying (204) licensed content (220) that is being presented by a local presentation device (218) may be carried out in other ways such as, for example, comparing video content to a repository of known video content, matching keywords contained in the licensed content (220) to determine a channel that the content is being presented over, matching keywords contained in the licensed content (220) against keywords associated with live events being broadcast, and so on.

The example method of FIG. 2 also includes determining (205), by the mobile device (202), whether the mobile device (202) is eligible to receive the licensed content (220). In the example method of FIG. 2, the mobile device (202) may be eligible to receive the licensed content (220) for a variety of reasons. For example, the mobile device (202) may include a subscription to some service through which the licensed content (220) is being delivered to the local presentation device (218), such as a subscription based premium television content provider. Alternatively, the mobile device (202) may be eligible to receive the licensed content (220) by virtue of being within a predetermined distance of the local presentation device (218). Consider an example in which the user of a mobile device (202) is at a sports bar to watch a pay-per-view sporting event that is being displayed on a local presentation device (218) such as a television. In such an example, the mobile device (202) may be eligible to receive the licensed content (220) because the user is already at a location at which the licensed content (220) is available for viewing.

Determining (205) whether the mobile device (202) is eligible to receive the licensed content (220) may therefore include determining (207) whether the mobile device (202) is within a predetermined distance of the local presentation device (218). The predetermined distance may be expressed in terms of feet, meters, and other units of measure used to express the physical distance between two devices. In addition, the predetermined distance may be expressed in other terms as will occur to one of skill in the art. For example, the predetermined distance may be expressed as a threshold decibel level, such that audio content being delivered by the local presentation device (218) must be above a certain decibel level at the location of the mobile device (202).

In such an example, identifying (204), by a mobile device (202), licensed content (220) being presented by a local presentation device (218) may therefore be carried out by first verifying that audio content being delivered by the local presentation device (218) is above the predetermined threshold decibel level at the location at which the mobile device (202) resides, otherwise the local presentation device (218) is not within a predetermined distance of the mobile device (202).

Consider the example in which the user of a mobile device (202) is at a sports bar to watch a pay-per-view sporting event that is being displayed on a local presentation device (218) such as a television. In such an example, the local presentation device (218) may determine (207) that it is within a predetermined distance of the local presentation device (218), for example, if audio content being delivered through the local presentation device (218) is audible above a predetermined threshold decibel level at the location at which the mobile device (202) resides—the table in the bar at which the user of the mobile device (202) is sitting.

The example method of FIG. 2 also includes requesting (206), by the mobile device (202), a license for the licensed content (220) being presented by the local presentation device (218). In the example of FIG. 2, requesting (206) a license for the licensed content (220) being presented by the local presentation device (218) may be carried out, for example, by submitting a request for a license to the distributor of the licensed content (220). The request for a license for the licensed content (220) may include, for example, an identification of the licensed content (220), the location of the mobile device (202), and so on.

Consider the example described above in which the user of a mobile device (202) is at a sports bar to watch a pay-per-view sporting event that is being displayed on a local presentation device (218) such as a television. In such an example, assume that the sports bar has purchased broadcast rights to the pay-per-view sporting event, such that all patrons of the bar are legally allowed to view the pay-per-view sporting event. In such an example, a user of a mobile device (202) may be seated in an area of the bar that does not have a good view of the television. As such, according to embodiments of the present invention, the user of the mobile device (202) may first identify (204) the pay-per-view sporting event as the licensed content (220) being presented by the local presentation device (218) and subsequently request (206) a license for the licensed content (220) being presented by the local presentation device (218), such that the pay-per-view sporting event can be delivered to the mobile device (202). In such an example, the mobile device (202) may request (206) a license for the licensed content (220), for example, by sending a request to a television provider that is delivering the pay-per-view sporting event. Such a request may include, for example, global positioning system (GPS) coordinates of the mobile device (202), thereby enabling the television provider that is delivering the pay-per-view sporting event to determine that the user of the mobile device (202) is at the sports bar—the sports bar that has purchased broadcast rights to the pay-per-view sporting event, and the sports bar whose patrons are legally allowed to view the pay-per-view sporting event. Alternatively, the request to a television provider that is delivering the pay-per-view sporting event may include other indicia of location such as, for example, data verifying that a user has checked-in to the sports bar via a social media content provider.

The example method of FIG. 2 also includes receiving (208), by the mobile device (202), the license (216) for the licensed content (220) being presented by the local presentation device (218). In the example of FIG. 2, the license (216) for the licensed content (220) being presented by the local presentation device (218) may be received (208), for example, via a message that is sent to the mobile device (202) from the distributor of the licensed content (220). The license (216) may include certain restrictions, for example, restrictions identifying the length of time that the license (216) valid, restrictions indicating that the license (216) is invalid if the mobile device (202) leaves a predetermined area, restrictions indicating that the license is not transferable, and so on.

The example method of FIG. 2 also includes receiving (210), by the mobile device (202), licensed content (214) for mobile device (202) presentation. In the example of FIG. 2, the licensed content (214) for mobile device (202) presentation represents a version of the licensed content (220) that is being delivered by the local presentation device (218). The licensed content (214) for mobile device (202) presentation may be different than the licensed content (220) that is being delivered by the local presentation device (218). For example, the licensed content (214) for mobile device (202) presentation may be in a data format that is compatible with the mobile device (202) but incompatible with the local presentation device (218). The licensed content (214) for mobile device (202) presentation may also different than the licensed content (220) that is being delivered by the local presentation device (218) as the video quality, audio quality, and other features of the licensed content (214, 220) are different. In the example method of FIG. 2, the licensed content (214) for mobile device (202) presentation may be received (210), for example, through a streaming video feed, through a special purpose application installed on the mobile device (202), and in other ways as will occur to those of skill in the art.

The example method of FIG. 2 also includes presenting (212), by the mobile device (202), the licensed content (214) for mobile device presentation. In the example method of FIG. 2, presenting (212), by the mobile device (202), the licensed content (214) for mobile device (202) presentation may be carried out, for example, by delivering video content associated with the licensed content (214) over a display screen of the mobile device (202), by delivering audio content associated with the licensed content (214) over a speakers installed in the mobile device (202), and so on.

Figure 3:
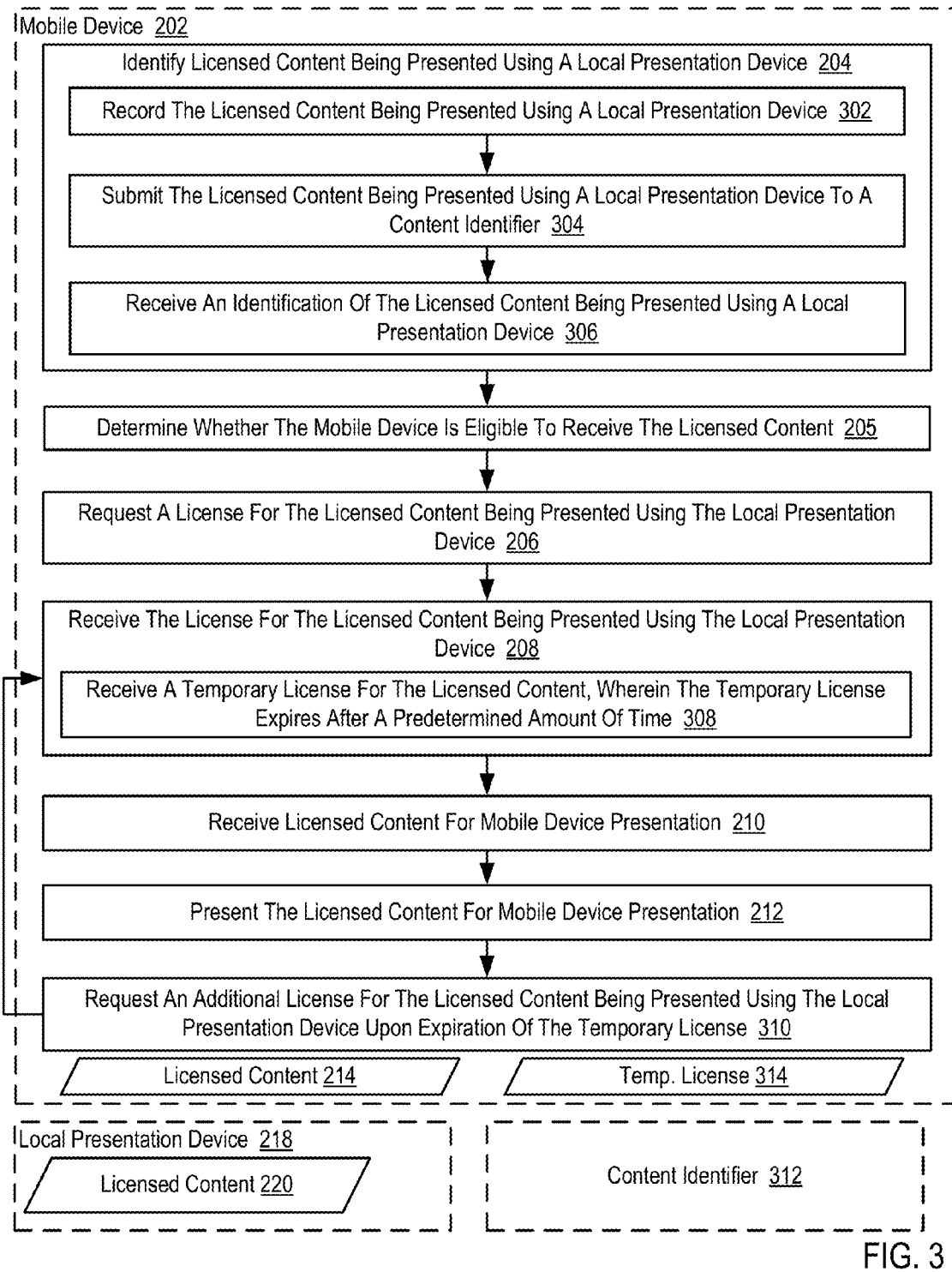
FIG. 3 sets forth a flow chart illustrating an exemplary method for distributing licensed content across multiple devices according to embodiments of the present invention.

For further explanation, FIG. 3 sets forth a flow chart illustrating an exemplary method for distributing licensed content across multiple devices according to embodiments of the present invention. The example method of FIG. 3 is similar to the example method of FIG. 2 as it also includes identifying (204) licensed content (220), determining (205) whether the mobile device (202) is eligible for the licensed content (220), requesting (206) a license for the licensed content (220) being presented by the local presentation device (218), receiving (208) the license (216) for the licensed content (220), receiving (210) licensed content (214) for mobile device presentation, and presenting (212) the licensed content (214).

In the example method of FIG. 3, identifying (204) licensed content (220) being presented by a local presentation device (218) includes recording (302), by the mobile device (202), the licensed content (220) being presented by a local presentation device (218). Recording (302), by the mobile device (202), the licensed content (220) being presented by a local presentation device (218) may be carried out, for example, through the use of a microphone installed in the mobile device (202), through the use of a video camera installed in the mobile device (202), or any combination thereof. For example, the mobile device (202) may record audio content that is being delivered by the local presentation device (218) by capturing audio content through the mobile device's microphone. Likewise, the mobile device (202) may record video content that is being delivered by the local presentation device (218) by aiming the video camera of the mobile device (202) at the local presentation device (218) and capturing video content. In the example method of FIG. 3, the recording, transmitting, and comparison of the content can be done in real-time to ensure that the local presentation device (218) and the mobile device (202) are in sync and to also determine that the license is valid. In addition, the license can be encrypted in such a way that it needs to input from the synchronized presentation device to decode the auxiliary content on the mobile device (202).

In the example method of FIG. 3, identifying (204) licensed content (220) being presented by a local presentation device (218) also includes submitting (304), by the mobile device (202), the licensed content (220) being presented by a local presentation device (218) to a content identifier (312). In the example of FIG. 3, the content identifier (312) may be embodied, for example, as a third party service for identifying audio content, video content, or any combination thereof. The content identifier (312) may alternatively be embodied as a module of computer program instructions that utilizes speech recognition technologies, video recognition technologies, and so on to compare captured content to a content repository.

In the example method of FIG. 3, submitting (304) the licensed content (220) being presented by the local presentation device (218) to a content identifier (312) may be carried out, for example, by submitting the audio content, video content, and other content that that was previously recorded (302) by the mobile device (202) to the content identifier (312). The audio content, video content, and other content that that was previously recorded (302) by the mobile device (202) may be submitted (304) to the content provider (312), for example, by submitting the content as audio files, video files, or multimedia files, over a data communications network utilized by the content identifier (312) to receive content.

Consider the example described above in which the user of a mobile device (202) is at a sports bar to watch a pay-per-view sporting event that is being displayed on a local presentation device (218) such as a television. In such an example, the user may use their mobile device (202) to record audio content and video content that is being delivered by the local presentation device (218). For example, the user may initiate a special purpose recording application installed on the mobile device (202) such that the user can aim the video camera installed on the device at the local presentation device (218) and record (302) the audio content and video content being delivered the local presentation device (218). In such an example, the user of the mobile device (202) may submit (304) the recorded content to a content identifier (312), for example, by creating a multimedia file that includes the recorded content and transmitting the multimedia file to the content identifier (312) over a data communications network such as an IP network, a telecommunications network, and so on.

In the example method of FIG. 3, identifying (204) licensed content (220) being presented by a local presentation device (218) also includes receiving (306), by the mobile device (202), an identification of the licensed content (220) being presented by a local presentation device (218). In the example method of FIG. 3, the identification of the licensed content (220) being presented by a local presentation device (218) may be included in a subsequent request for a license, such that the distributor of licensed content may identify the particular content that a user of a mobile device (202) is requesting a license for. The identification of the licensed content (220) being presented by a local presentation device (218) may be received (306), for example, through a message that is sent from the content identifier (312) to the mobile device (202), through a message that is sent from the content identifier (312) to an account associated with the user of the mobile device (202), and so on.

In the example method of FIG. 3, receiving (208) the license for the licensed content (220) being presented by the local presentation device (218) can include receiving (308) a temporary license (314) for the licensed content. In the example method of FIG. 3, the temporary license (314) may be temporary in the sense that the temporary license (314) expires after a predetermined amount of time. For example, the temporary license (314) may expire after a predetermined amount of time after the temporary license (314) was received (208), the temporary license (314) may expire at a predetermined time, the temporary license (314) may expire after the temporary license (314) has been utilized for a predetermined amount of time, and so on. Alternatively, the temporary license (314) may be temporary in the sense that the temporary license (314) expires when the mobile device (202) is no longer within a predefined area, the temporary license (314) expires when more than one user attempts to use the temporary license (314), the temporary license (314) expires when the user of the mobile device (314) fails to respond to a prompt used to determined that the user of the mobile device (314) is still using the temporary license (314), and so on.

The example method of FIG. 3 also includes requesting (310), by the mobile device (202), an additional license for the licensed content (220) being presented by the local presentation device (218) upon expiration of the temporary license (314). In the example of FIG. 3, requesting (310) an additional license for the licensed content (220) being presented by the local presentation device (218) upon expiration of the temporary license (314) may be carried out, for example, by submitting a request for an additional license to the distributor of the licensed content (220). The request for an additional license for the licensed content (220) may include, for example, an identification of the licensed content (220), the location of the mobile device (202), an identification of the temporary license (314) that expired, an indication of the number of times that a previously held temporary license (314) expired, and so on.

Figure 4:
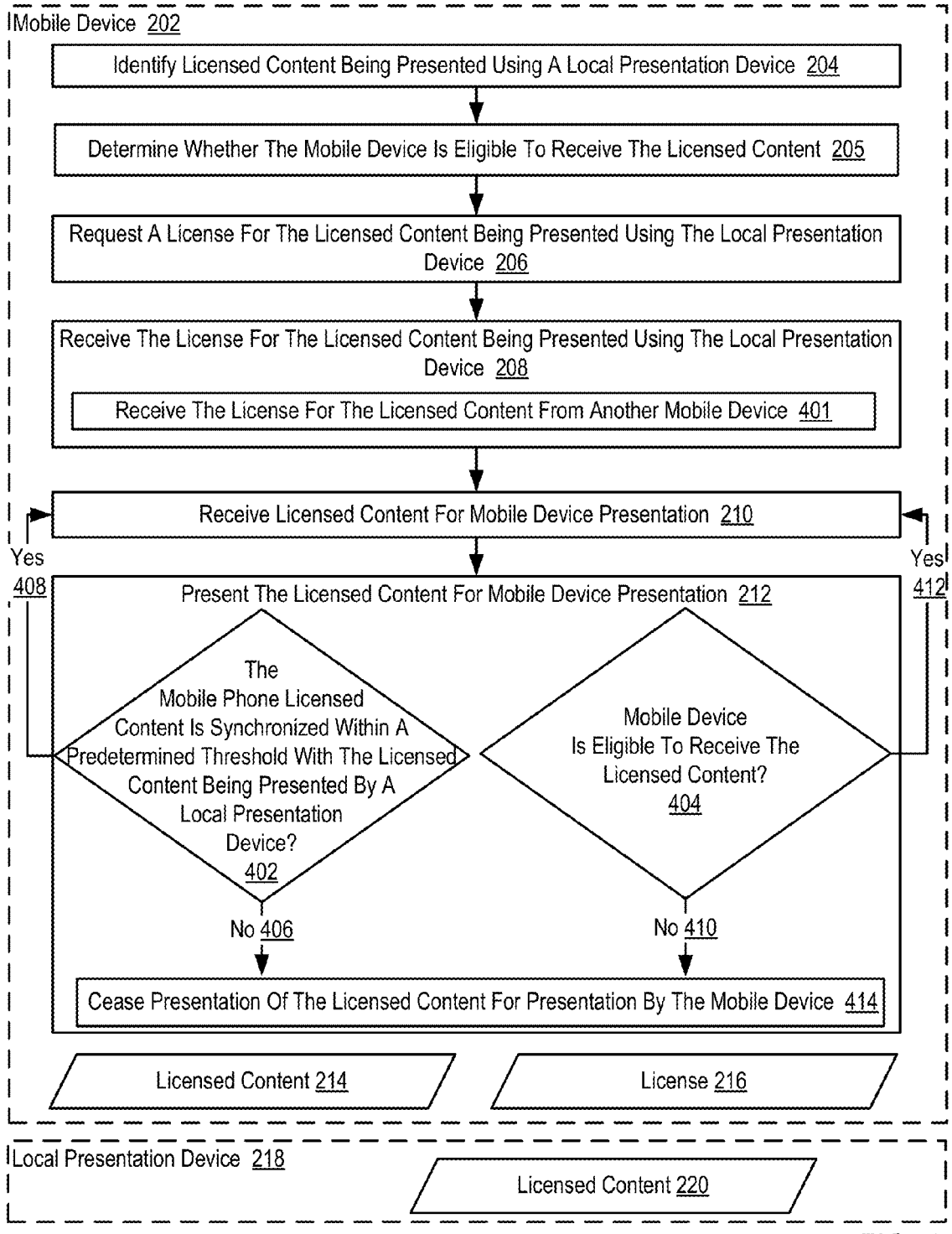
FIG. 4 sets forth a flow chart illustrating an exemplary method for distributing licensed content across multiple devices according to embodiments of the present invention.

For further explanation, FIG. 4 sets forth a flow chart illustrating an exemplary method for distributing licensed content across multiple devices according to embodiments of the present invention. The example method of FIG. 4 is similar to the example method of FIG. 2 as it also includes identifying (204) licensed content (220), determining (205) whether the mobile device (202) is eligible for the licensed content (220), requesting (206) a license for the licensed content (220) being presented by the local presentation device (218), receiving (208) the license (216) for the licensed content (220), receiving (210) licensed content (214) for mobile device presentation, and presenting (212) the licensed content (214).

In the example method of FIG. 4, receiving (208) the license (216) for the licensed content (220) may include receiving (401) the license (216) for the licensed content (220) from another mobile device. Consider an example in which a first mobile device receives a license for licensed content (220). Such a license may specify that the license may be used by more than one device. In such an example, the first mobile device may therefore send its license for the licensed content to a second mobile device, such that the second mobile device receives (401) the license (216) for the licensed content (220) from another mobile device.

In the example method of FIG. 4, presenting (212) the licensed content (214) for presentation by the mobile device (202) includes determining (402), by the mobile device (202), whether the licensed content (214) for presentation by the mobile device (202) is synchronized within a predetermined threshold with the licensed content (220) being presented by the local presentation device (218). In the example of FIG. 2, determining (402) whether the licensed content (214) for presentation by the mobile device (202) is synchronized within a predetermined threshold with the licensed content (220) being presented by the local presentation device (218) may be carried out, for example, by recording aspects of the licensed content (220) being presented by the local presentation device (218) and comparing the licensed content (220) being presented by the local presentation device (218) to the licensed content (214) for presentation by the mobile device (202).

Consider the example described above in which the user of a mobile device (202) is at a sports bar to watch a pay-per-view sporting event that is being displayed on a local presentation device (218) such as a television. In such an example, the user may use their mobile device (202) to record audio content and video content that is being delivered by the local presentation device (218). For example, the user may initiate a special purpose recording application installed on the mobile device (202) such that the user can aim the video camera installed on the device at the local presentation device (218) and record (302) the audio content and video content being delivered the local presentation device (218). In such an example, the user of the mobile device (202) may compare the recorded content with the licensed content (214) for presentation by the mobile device (202). The recorded content and the licensed content (214) for presentation by the mobile device (202) may both include timestamps such that the same slices of the licensed content (220) being presented by the local presentation device (218) and the licensed content (214) for presentation by the mobile device (202) can be compared.

In the example method of FIG. 4, presenting (212) the licensed content (214) for presentation by the mobile device (202) also includes responsive to determining that the licensed content (214) for presentation by the mobile device (202) is not (406) synchronized within a predetermined threshold with the licensed content (220) being presented by the local presentation device (218), ceasing (414) presentation of the licensed content (214) for presentation by the mobile device (202). In the example method of FIG. 4, ceasing (414) presentation of the licensed content (214) for presentation by the mobile device (202) may be carried out by delaying the presentation of the licensed content (214) for presentation by the mobile device (202) for a period so as to compensate for the lack of synchronization. For example, if it is determined that the licensed content (214) for presentation by the mobile device (202) is three seconds ahead of the licensed content (220) being presented by the local presentation device (218), presentation of the licensed content (214) for presentation by the mobile device (202) may be delayed for three seconds. Alternatively, ceasing (414) presentation of the licensed content (214) for presentation by the mobile device (202) may be carried out by revoking all licenses and disabling all access to the licensed content (214) such that a mobile device (202) must reinitiate the processing of accessing the licensed content (220) being presented by the local presentation device (218).

Consider the example described above in which the user of a mobile device (202) is at a sports bar to watch a pay-per-view sporting event that is being displayed on a local presentation device (218) such as a television. In such an example, the video content being delivered by the local presentation device (218) may be out of synch with audio content being delivered through the mobile device (202). In such an example, if the lack of synchronization can be cured, the presentation of the licensed content (214) by the mobile device (202) should be altered to achieve synchronization between the licensed content (214) for presentation by the mobile device (202) and the licensed content (220) being presented by the local presentation device (218). If the lack of synchronization cannot be cured, the viewing experience may have deteriorated for the user of the mobile device (202) to a point at which it is not beneficial to deliver content through the mobile device (202) at all.

In the example method of FIG. 4, presenting (212) the licensed content (214) for presentation by the mobile device (202) can alternatively include determining (404), by the mobile device (202) at predetermined intervals, whether the mobile device (202) is eligible to receive the licensed content (220). As described above, the mobile device (202) may be eligible to receive the licensed content (220), for example, by virtue of being within a predetermined distance of the local presentation device (218). The predetermined distance between the mobile device (202) and the local presentation device (218) may be expressed in terms of feet, meters, and other units of measure used to express the physical distance between two devices. In addition, the predetermined distance may be expressed in other terms as will occur to one of skill in the art. For example, the predetermined distance may be expressed as a threshold decibel level, such that audio content being delivered by the local presentation device (218) must be above a certain decibel level at the location of the mobile device (202). Determining (404) whether the mobile device (202) is eligible to receive the licensed content (220) may therefore be carried out, for example, by comparing the GPS coordinates of the mobile device (202) to a predetermined acceptable range, by verifying that audio content being delivered by the local presentation device (218) is above the predetermined threshold decibel level at the location at which the mobile device (202) resides, and so on.

In the example method of FIG. 4, presenting (212) the licensed content (214) for presentation by the mobile device (202) can also include responsive to determining the local presentation device (218) is not (410) within the predetermined distance of the mobile device (202), ceasing (414) presentation of the licensed content (214) for presentation by the mobile device (202). In the example method of FIG. 4, ceasing (414) presentation of the licensed content (214) for presentation by the mobile device (202) may be carried out by revoking all licenses and disabling all access to the licensed content (214) such that a mobile device (202).

Consider the example described above in which the user of a mobile device (202) is at a sports bar to watch a pay-per-view sporting event that is being displayed on a local presentation device (218) such as a television. In such an example, the user of the mobile device (202) should not have access to the pay-per-view sporting event that is being displayed on a local presentation device (218) after the user of the mobile device (202) leaves the bar, as the user of the mobile device (202) only had access to the pay-per-view sporting event by virtue of being in the bar. In such an example, if it is determined that the user of the mobile device (202) is no longer within the predetermined distance of the local presentation device (218) (e.g., the user of the mobile device (202) has left the bar), the user of the mobile device (202) should no longer have access to the pay-per-view sporting event through their mobile device (202) and access to the pay-per-view sporting event through their mobile device (202) can be revoked.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of distributing licensed content across multiple devices, the method comprising:
    identifying, by a mobile device, licensed content being presented by a local presentation device; wherein the licensed content includes audio content; wherein identifying licensed content being presented by the local presentation device includes determining, by the mobile device, a decibel level of the audio content received at the mobile device from the local presentation device;
    determining, by the mobile device, that the decibel level is above a predetermined level;
    determining based on the determination that the decibel level is above the predetermined level, by the mobile device, that the mobile device is eligible to receive the licensed content;
    requesting based on the determination that the mobile device is eligible to receive the licensed content, by the mobile device, a license for the licensed content being presented by the local presentation device;
    receiving, by the mobile device, the license for the licensed content being presented by the local presentation device;
    receiving, by the mobile device, the licensed content for mobile device presentation; and
    presenting, by the mobile device, the licensed content for mobile device presentation.

2. The method of claim 1 wherein identifying, by the mobile device, licensed content being presented by a local presentation device includes:
    recording, by the mobile device, the licensed content being presented by the local presentation device;
    submitting, by the mobile device, the licensed content being presented by the local presentation device to a content identifier; and
    receiving, by the mobile device, an identification of the licensed content being presented by the local presentation device.

3. The method of claim 1 wherein receiving, by the mobile device, the license for the licensed content being presented by the local presentation device includes receiving a temporary license for the licensed content.

4. The method of claim 3 further comprising requesting, by the mobile device, an additional license for the licensed content being presented by the local presentation device upon expiration of the temporary license.

5. The method of claim 1 wherein receiving, by the mobile device, the license for the licensed content being presented by the local presentation device includes receiving the license for the licensed content from another mobile device.

6. The method of claim 1 wherein presenting, by the mobile device, the licensed content for presentation by the mobile device further comprises:
    determining, by the mobile device, whether the licensed content for presentation by the mobile device is synchronized within a predetermined threshold with the licensed content for presentation by the mobile device; and
    responsive to determining that the licensed content for presentation by the mobile device is not synchronized within a predetermined threshold with the licensed content being presented using a local presentation device, ceasing presentation of the licensed content for presentation by the mobile device.

7. The method of claim 1 wherein determining whether the mobile device is eligible to receive the licensed content includes determining whether the mobile device is within a predetermined distance of the local presentation device.

8. The method of claim 1 wherein presenting, by the mobile device, the licensed content for presentation by the mobile device further comprises:
    determining, by the mobile device at predetermined intervals, whether the mobile device is eligible to receive the licensed content; and
    responsive to determining that the mobile device is not eligible to receive the licensed content, ceasing presentation of the licensed content for presentation by the mobile device.

* * * * *